US010349716B2

(12) United States Patent
Wang (10) Patent No.: US 10,349,716 B2
(45) Date of Patent: Jul. 16, 2019

(54) PROTECTIVE COVER ASSEMBLY AND ACCESSORY UNIT ATTACHMENT MEMBER FOR HANDHELD DEVICE

(71) Applicant: EVOLUTIVE LABS CO., LTD., Taichung (TW)

(72) Inventor: Ching-Fu Wang, Taichung (TW)

(73) Assignee: EVOLUTIVE LABS CO., LTD., Taichung (TW)

( * ) Notice: Subject to any disclaimer, the term of this patent is extended or adjusted under 35 U.S.C. 154(b) by 19 days.

(21) Appl. No.: 15/728,152

(22) Filed: Oct. 9, 2017

(65) Prior Publication Data
US 2018/0199686 A1    Jul. 19, 2018

(30) Foreign Application Priority Data

Jan. 13, 2017    (TW) .............................. 106101142 A (51) Int. Cl.
| | |
|---|---|
| A45C 13/00 | (2006.01) |
| A45F 5/00 | (2006.01) |
| A45C 11/00 | (2006.01) |
| G02B 7/02 | (2006.01) |
| H04N 5/225 | (2006.01) |

(52) U.S. Cl.
CPC ............ *A45C 13/001* (2013.01); *A45C 11/00* (2013.01); *A45F 5/00* (2013.01); *G02B 7/02* (2013.01); *G02B 7/022* (2013.01); *H04N 5/2252* (2013.01); *H04N 5/2254* (2013.01); *H04N 5/2257* (2013.01); *A45C 2011/002* (2013.01)

(58) Field of Classification Search
CPC ......... A45C 13/001; A45C 11/00; A45F 5/00; G02B 7/02; G02B 7/022; H04N 5/2252; H04N 5/2254; H04N 5/2257
See application file for complete search history.

(56) References Cited

U.S. PATENT DOCUMENTS

| | | | | |
|---|---|---|---|---|
| 9,294,660 | B2* | 3/2016 | O'Neill ................ | H04N 5/2254 |
| 9,596,393 | B2* | 3/2017 | Barros ................ | H04N 5/2252 |
| 2014/0176787 | A1* | 6/2014 | Sheng .................. | H04N 5/2254 |
| | | | | 348/360 |
| 2014/0267882 | A1* | 9/2014 | O'Neill ............... | H04N 5/2254 |
| | | | | 348/360 |
| 2016/0219194 | A1* | 7/2016 | Barros ................ | H04N 5/2252 |

FOREIGN PATENT DOCUMENTS

CN            105980925 A         9/2016

* cited by examiner

*Primary Examiner* — Nicholas G Giles
(74) *Attorney, Agent, or Firm* — MLO, a professional corp.

(57) ABSTRACT

A protective cover assembly includes a protective cover having a cover plate body with opposite inner and outer cover plate surfaces, and a through hole extending through the inner and outer cover plate surfaces and defined by a hole-defining wall having a stepped surface. An attachment member is removably embedded in the through hole, and includes a base plate, an outer flange extending outwardly from and surrounding the base plate, a main hole extending through the base plate, and an annular protrusion protruding from an inner peripheral edge of the main hole and extending out of the through hole. The outer flange has a first flange surface flush with a base plate surface of the base plate, and a second flange surface abutting against the stepped surface.

14 Claims, 13 Drawing Sheets

PROTECTIVE COVER ASSEMBLY AND ACCESSORY UNIT ATTACHMENT MEMBER FOR HANDHELD DEVICE

CROSS-REFERENCE TO RELATED APPLICATION

This application claims priority of Taiwanese Patent Application No. 106101142, filed on Jan. 13, 2017.

FIELD

The disclosure relates to a protective cover assembly, more particularly to a protective cover assembly and a removable accessory unit attachment member for a handheld device.

BACKGROUND

A protective cover assembly, as disclosed in Chinese Patent Publication No. CN105980925, includes a protective cover having a through hole, and a retainer clamped to an outer portion of the protective cover for fixing an accessory unit to the latter. Since the retainer and the accessory unit are both disposed on the outer portion of the protective cover, their chance of being hit and falling is increased. Further, because the retainer is simply clamped to the protective cover, when impacted by an external force, the retainer together with the accessory unit may fall off from the protective cover. Moreover, since the size of the opening matches with that of the retainer, and since the retainer must have a large surface area in order to stably clamp to the protective cover, when the accessory unit is not in use, the protective cover will present a rather large opening, thereby adversely affecting an appearance thereof.

SUMMARY

Therefore, an object of the present disclosure is to provide a protective cover assembly for a handheld device having an embedded accessory unit attachment member.

According to one aspect of this disclosure, a protective cover assembly for a handheld device having an accessory unit comprises a protective cover and an attachment member. The protective cover is configured to removably connect with and to partially cover the handheld device, and includes a cover plate body having opposite inner and outer cover plate surfaces, and a through hole extending through the inner and outer cover plate surfaces and defined by a hole-defining wall. The hole-defining wall includes a first peripheral wall surface having an outer peripheral end connected to the inner cover plate surface, a second peripheral wall surface connected between an inner peripheral end of the first peripheral wall surface and the outer cover plate surface, and a stepped portion extending from the second peripheral wall surface toward the center of the through hole and having a stepped surface opposite to the outer cover plate surface.

The attachment member is disposed between the protective cover and the handheld device, and is removably embedded in the through hole. The attachment member includes a base plate, an outer flange extending outwardly from and surrounding the base plate, a main hole extending through the base plate, an annular protrusion protruding from an inner peripheral edge of the main hole and extending out of the through hole for removable attachment of the accessory unit therewith, and an auxiliary hole extending through the base plate adjacent to the main hole. The base plate has opposite first and second base plate surfaces, and a base outer peripheral surface connected between the first and second base plate surfaces. The outer flange has a first flange surface flush with the first base plate surface, and a second flange surface opposite to the first flange surface and abutting against the stepped surface.

According to another aspect of this disclosure, an attachment member for removable attachment of an accessory unit therewith comprises a base plate, an outer flange, a main hole, an annular protrusion, and an auxiliary hole. The outer flange extends outwardly from and surrounds the base plate. The main hole extends through the base plate. The annular protrusion protrudes from an inner peripheral edge of the main hole in a direction away from the base plate for removable attachment of the accessory unit therewith. The auxiliary hole extends through the base plate adjacent to the main hole.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Before the present disclosure is described in greater detail with reference to the accompanying embodiments, it should be noted herein that like elements are denoted by the same reference numerals throughout the disclosure.

Referring to FIGS. 1 to 4, a protective cover assembly according to the first embodiment of the present disclosure is shown to include a protective cover 1 and an attachment member 2. The protective cover assembly of this disclosure is suitable for use in covering a handheld device 9 which has an accessory unit 91. The accessory unit 91 is exemplified as an external lens unit in this embodiment, but is not limited as such.

The protective cover 1 is removably connected to the handheld device 9 and partially covers the same. The protective cover 1 includes a cover plate body 11 having opposite inner and outer cover plate surfaces 111, 112, and a through hole 13 extending through the inner and outer cover plate surfaces 11, 112 and defined by a hole-defining wall 12. In this embodiment, the protective cover 1 covers the back side and a periphery of the handheld device 9, and the through hole 13 corresponds in position to the lens of the handheld device 9, but is not limited thereto. The hole-defining wall 12 has a first peripheral wall surface 121 having an outer peripheral end connected to the inner cover plate surface 111, a second peripheral wall surface 122 connected between an inner peripheral end of the first peripheral wall surface 121 and the outer cover plate surface 112, and a stepped portion 14 extending from the second peripheral wall surface 122 toward the center of the through hole 13 and having a stepped surface 141 opposite to the outer cover plate surface 112.

The attachment member 2 is disposed between the protective cover 1 and the handheld device 9, and is removably embedded in the through hole 13. The attachment member 2 includes a base plate 21, an outer flange 22, a main hole 24 extending through the base plate 21 and defined by a main hole-defining wall 23, an annular protrusion 25, and an auxiliary hole 27 extending through the base plate 21 adjacent to the main hole 24 and defined by an auxiliary hole-defining wall 26. In this embodiment, the size of the main hole 24 corresponds to the lens of the handheld device 9, while the size of the auxiliary hole 27 corresponds to the flashlight of the handheld device 9. The auxiliary hole-defining wall 26 has a dark hue that is not easily penetrated by light.

Figure 4:
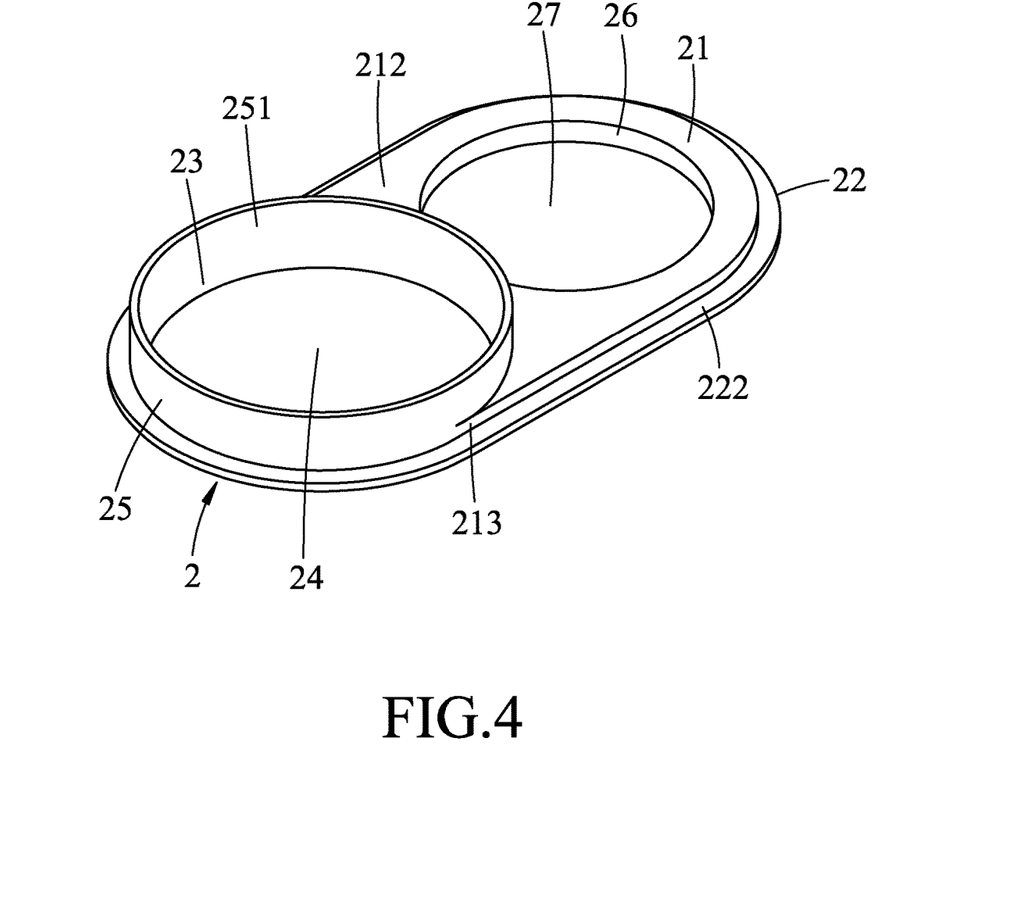
FIG. 4 is an enlarged perspective view of an attachment member of the first embodiment.

The base plate 21 has opposite first and second base plate surfaces 211, 212, and a base outer peripheral surface 213 connected between the first and second base plate surfaces 211, 212.

Figure 1:
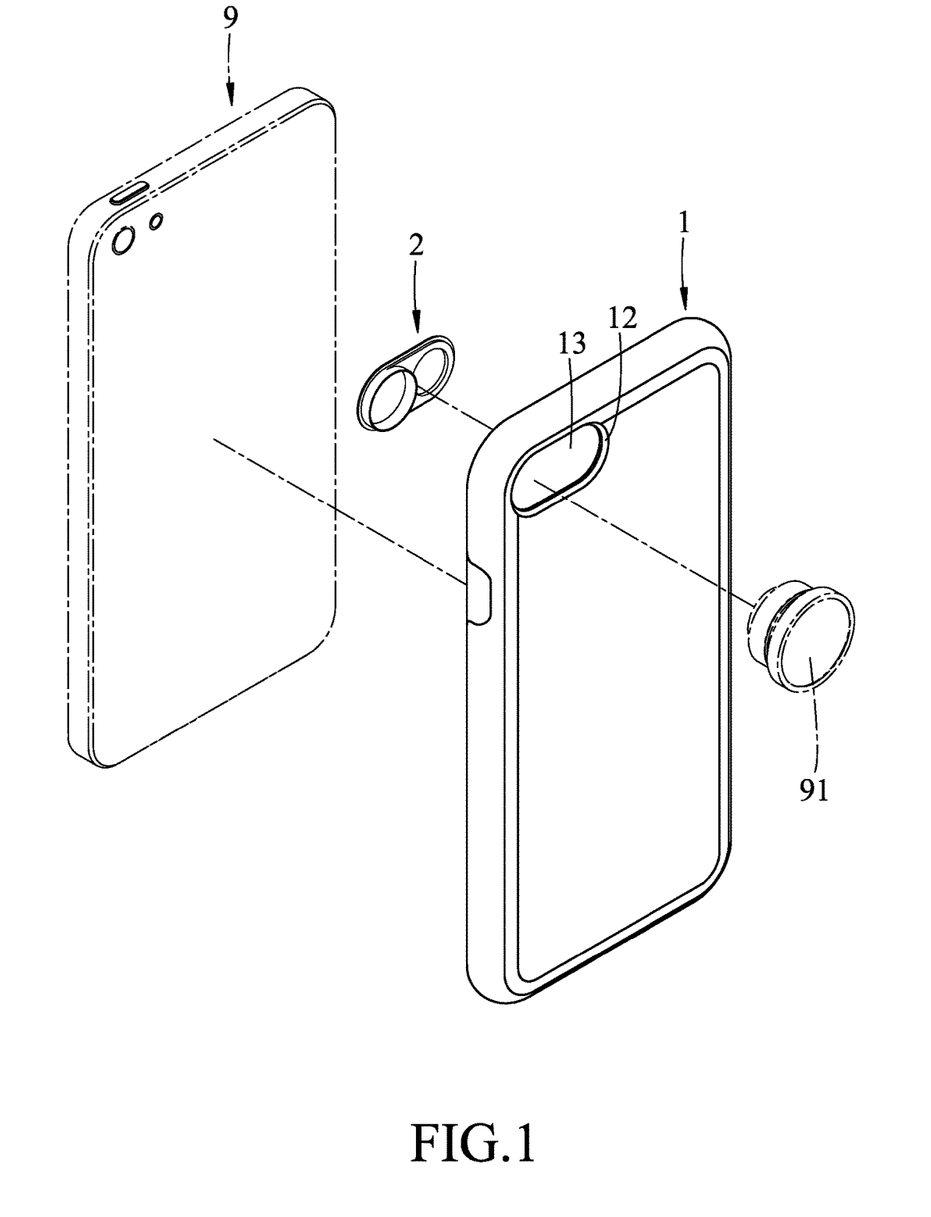
FIG. 1 is an exploded perspective view of a protective cover assembly according to the first embodiment of the present disclosure and a handheld device.
Figure 2:
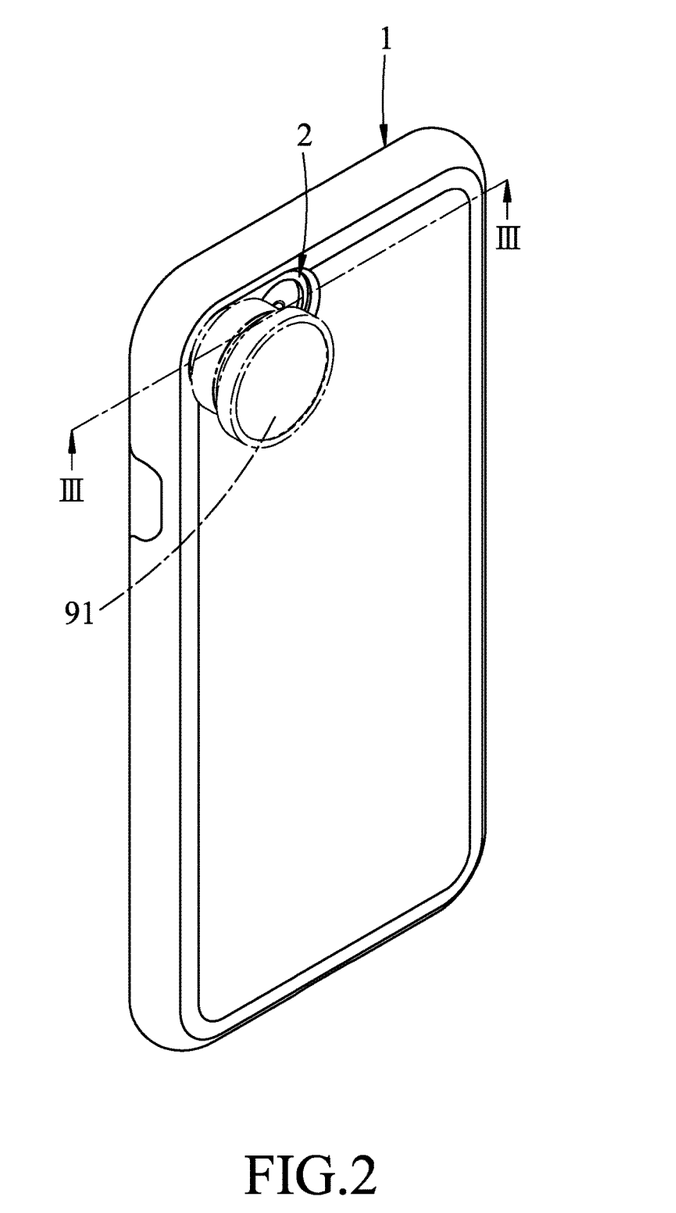
FIG. 2 is an assembled perspective view of FIG. 1.
Figure 3:
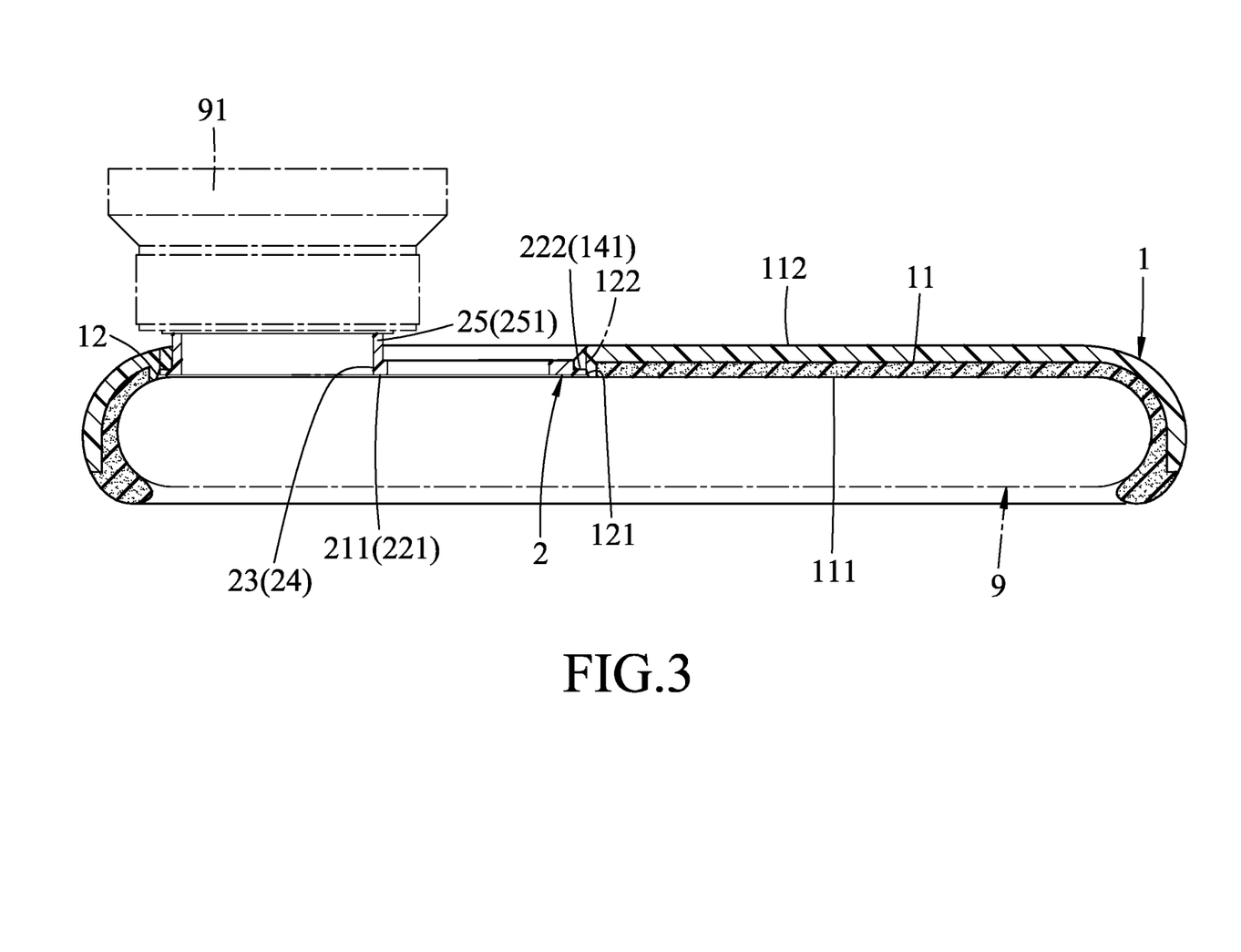
FIG. 3 is a sectional view of the first embodiment taken along line III-III of FIG. 2.

The outer flange 22 extends outwardly from and surrounds the base plate 21. The outer flange 22 has a first flange surface 221 flush with the first base plate surface 211, and a second flange surface 222 opposite to the first flange surface 221 and abutting against the stepped surface 141, as shown in FIG. 3.

The annular protrusion 25 protrudes from an inner peripheral edge of the main hole-defining wall 23 and extends out of the through hole 13 for removable attachment of the accessory unit 91 therewith. The annular protrusion 25 has an inner surrounding surface 251 connected to and flush with the main hole-defining wall 23, as shown in FIGS. 3 and 4.

Referring again to FIGS. 1 to 3, use of the protective cover assembly of this disclosure is quite simple. The protective cover 1 is first placed on a support surface such that the inner cover plate surface 111 thereof faces upward, after which the annular protrusion 25 of the attachment member 2 is inserted into the through hole 13. Finally, the handheld device 9, with the back side thereof facing downward, is pressed into the cover plate body 11. After the protective cover assembly of this disclosure is assembled with the handheld device 9, if use of the accessory unit 91 is required, a connecting portion of the accessory unit 91 is simply aligned with the annular protrusion 25 and is then pressfitted into the main hole 24.

From the foregoing, the advantages of the first embodiment can be summarized as follows:

1. With the attachment member 2 being pressed and clamped between the protective cover 1 and the handheld device 9, in comparison with the existing protective cover assembly, only a portion of the annular protrusion 25 protrudes out of the protective cover 1, so that the attachment member 2 will not fall off in the presence of an external force. Hence, the stability of the accessory unit 91 during use thereof can be enhanced.

2. With the main hole 24 and the auxiliary hole 27 directly corresponding to the positions of the specific functions of the handheld device 9, in comparison with the existing protective cover assembly, the size of the attachment member 2 can be reduced, and the size of the through hole 13 can also be matchingly reduced. Hence, the protective function of the protective cover 1 can be enhanced, so that the protective cover 1 can fully protect the handheld device 9 even when used alone.

3. With the annular protrusion 25 providing mounting of the accessory unit 91, in comparison with the existing protective cover assembly, this disclosure can effectively utilize the spatial arrangement of the attachment member 2 to further reduce the size thereof.

4. With the stepped portion 14 of the protective cover 1 and the outer flange 22 of the attachment member 2 corresponding to each other, in comparison with the existing protective cover assembly, the assembly of the attachment member 2 is not only easy, but the tightness and stability of the attachment member 2 during embedment in the protective cover 1 can also be achieved, so that the function of the accessory unit 91 during its operation is ensured and will not be affected.

Figure 5:
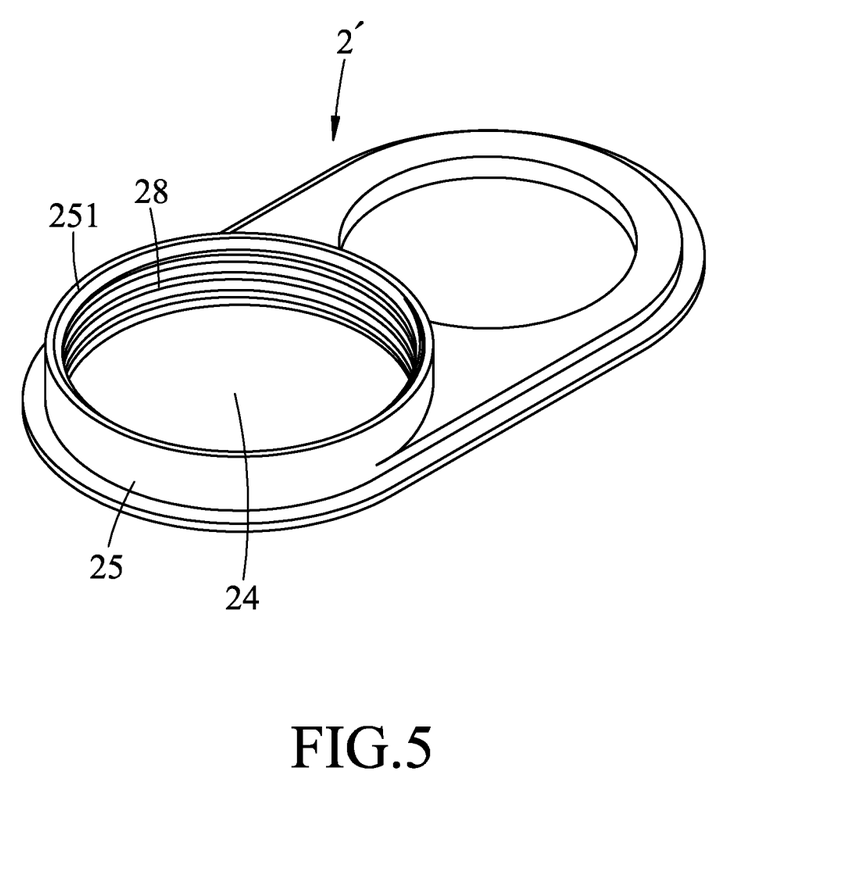
FIG. 5 is a perspective view of an alternative form of the attachment member of the first embodiment.

FIG. 5 illustrates an alternative form of the attachment member 2 of the first embodiment. In this case, the attachment member 2' further includes a threaded portion 28 formed on the main hole-defining wall 23 (see FIG. 4) and the inner surrounding surface 251 of the annular protrusion 25 for threaded engagement with the accessory unit 91. The threaded portion 28 can further strengthen and stabilize the connection between the accessory unit 91 and the attachment member 2', and can increase the load capacity of the attachment member 2', so that the attachment member 2' can connect with a heavier accessory unit 91, such as an external flash unit, a portable speaker, a portable tripod set, a mobile power supply, etc.

Figure 6:
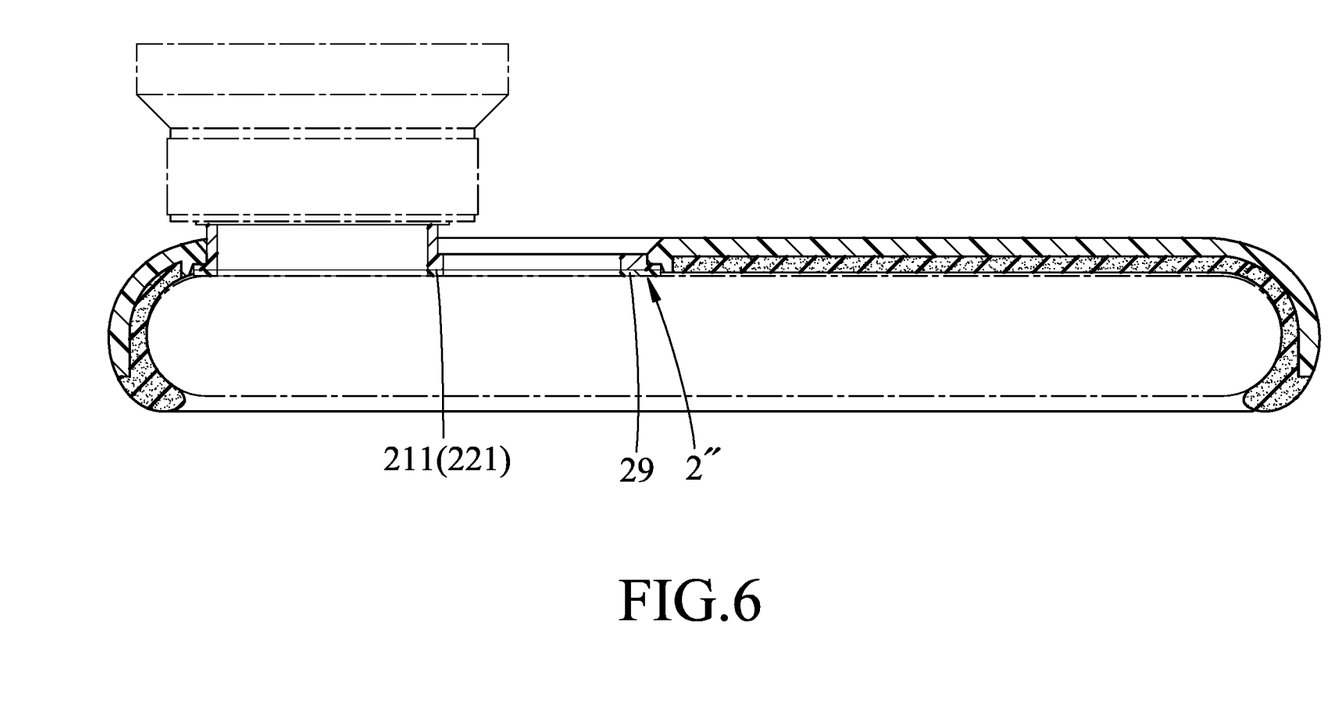
FIG. 6 is a view similar to FIG. 3, but illustrating another alternative form of the attachment member of the first embodiment.

FIG. 6 illustrates another alternative form of the attachment member 2 of the first embodiment. In this case, the attachment member 2" further includes a scratch-resistant layer 29 disposed on the first base plate surface 211 and the first flange surface 221 to prevent the attachment member 2" from scratching the back side of the handheld device 9. The material of the scratch-resistant layer 29 has a hardness smaller than that of the lead of a 2H pencil.

Figure 7:
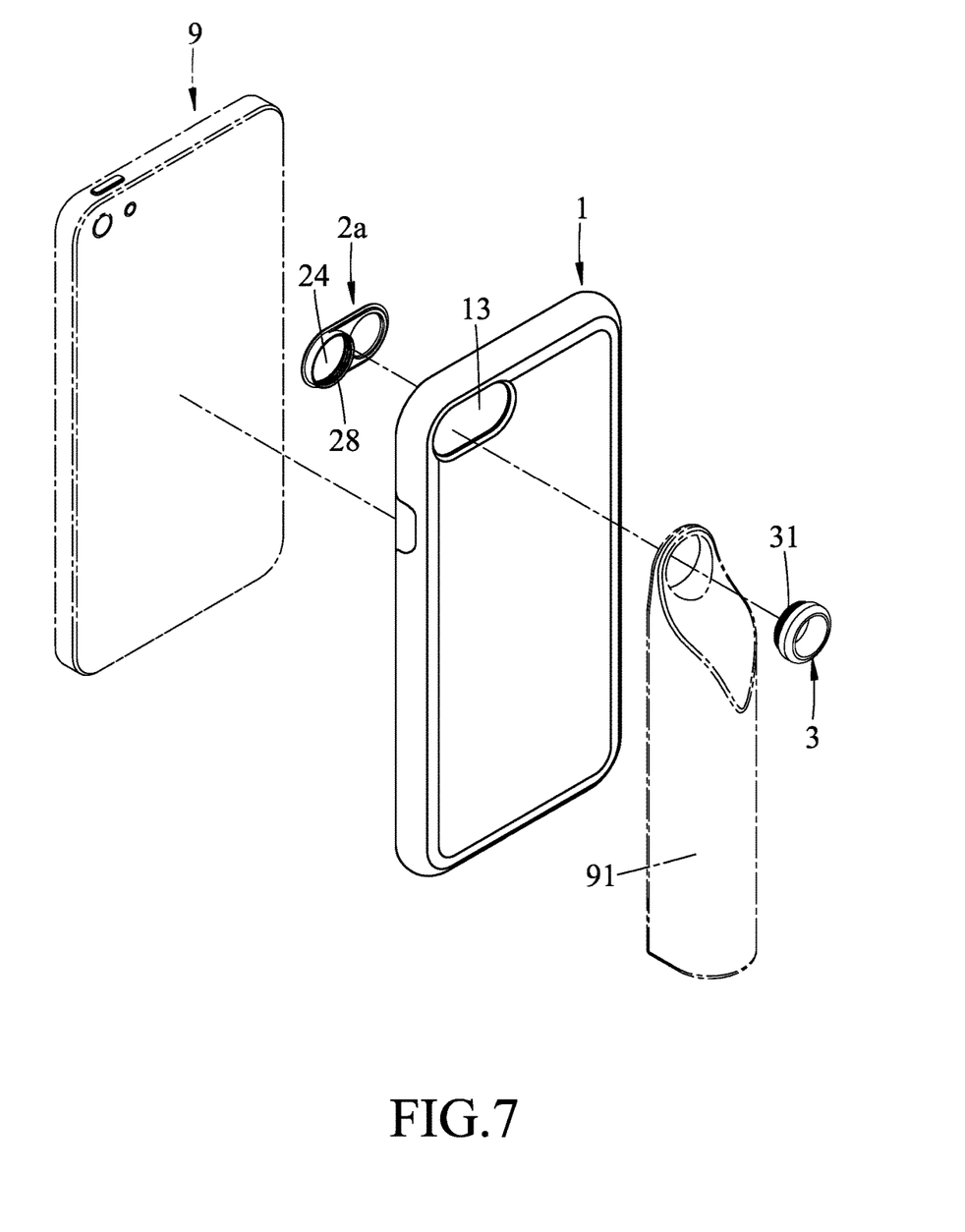
FIG. 7 is an exploded perspective view of a protective cover assembly according to the second embodiment of the present disclosure and a handheld device.
Figure 8:
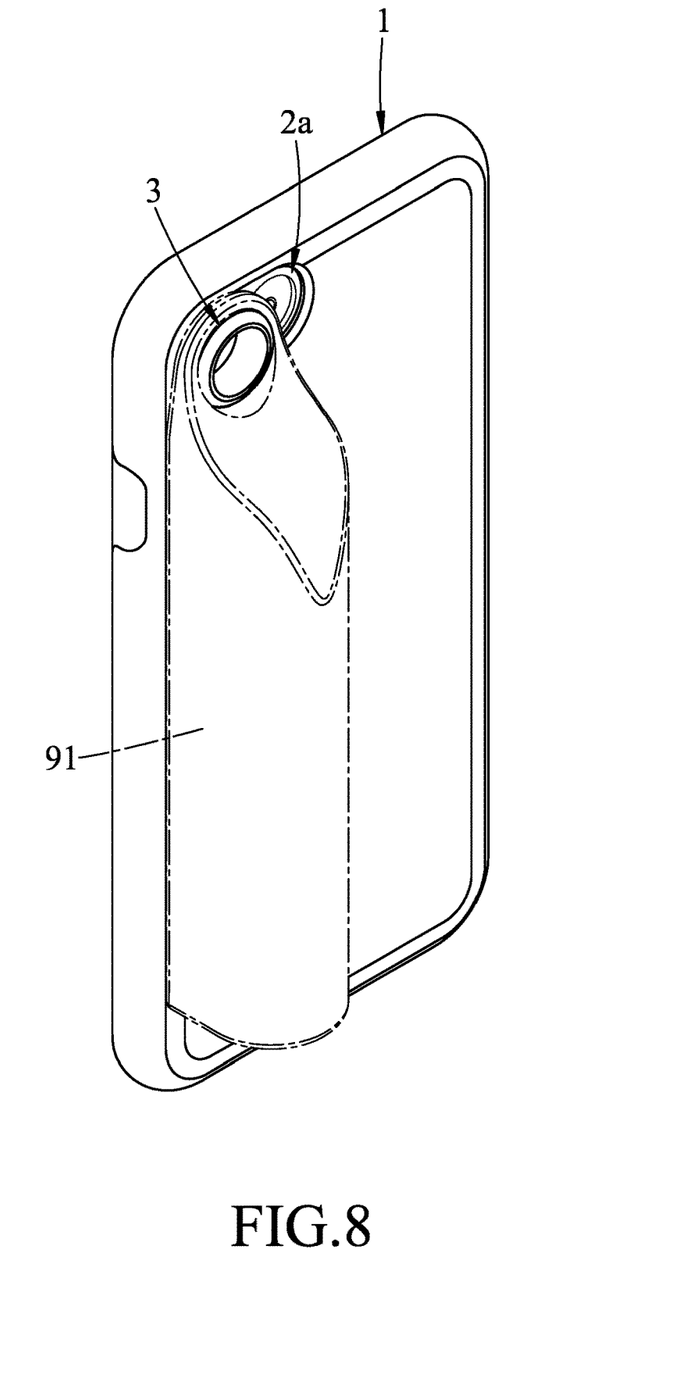
FIG. 8 is an assembled perspective view of FIG. 7.
Figure 9:
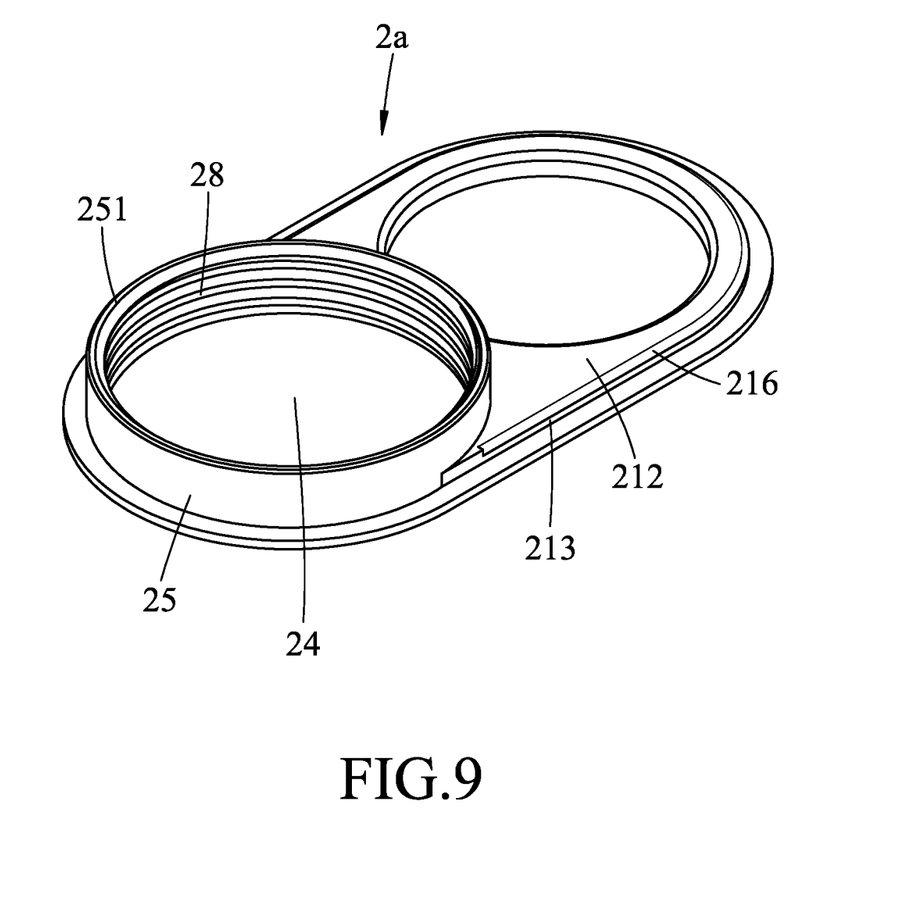
FIG. 9 is an enlarged perspective view of an attachment member of the second embodiment.
Figure 10:
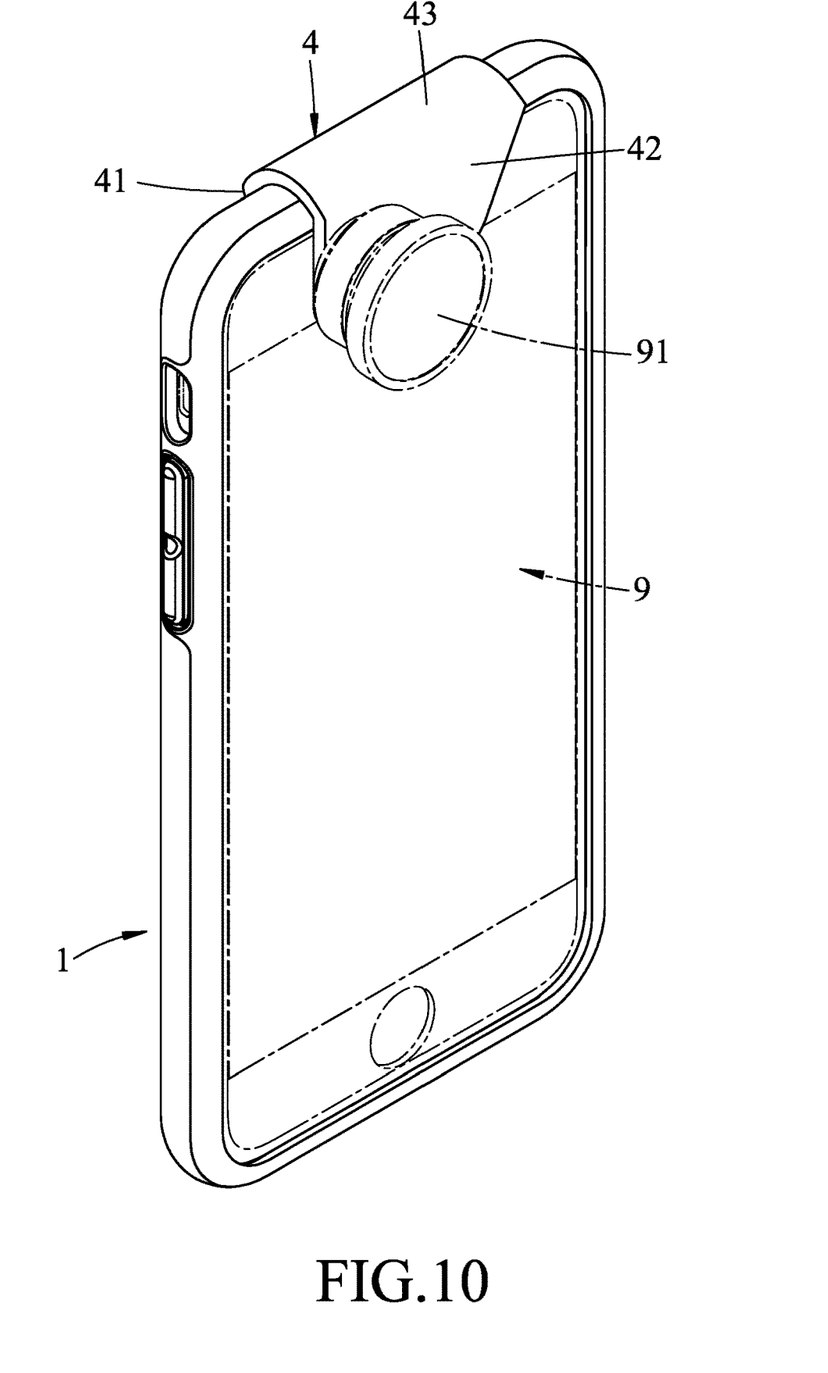
FIG. 10 is an assembled front perspective view of a protective cover assembly according to the third embodiment of the present disclosure and a handheld device.
Figure 11:
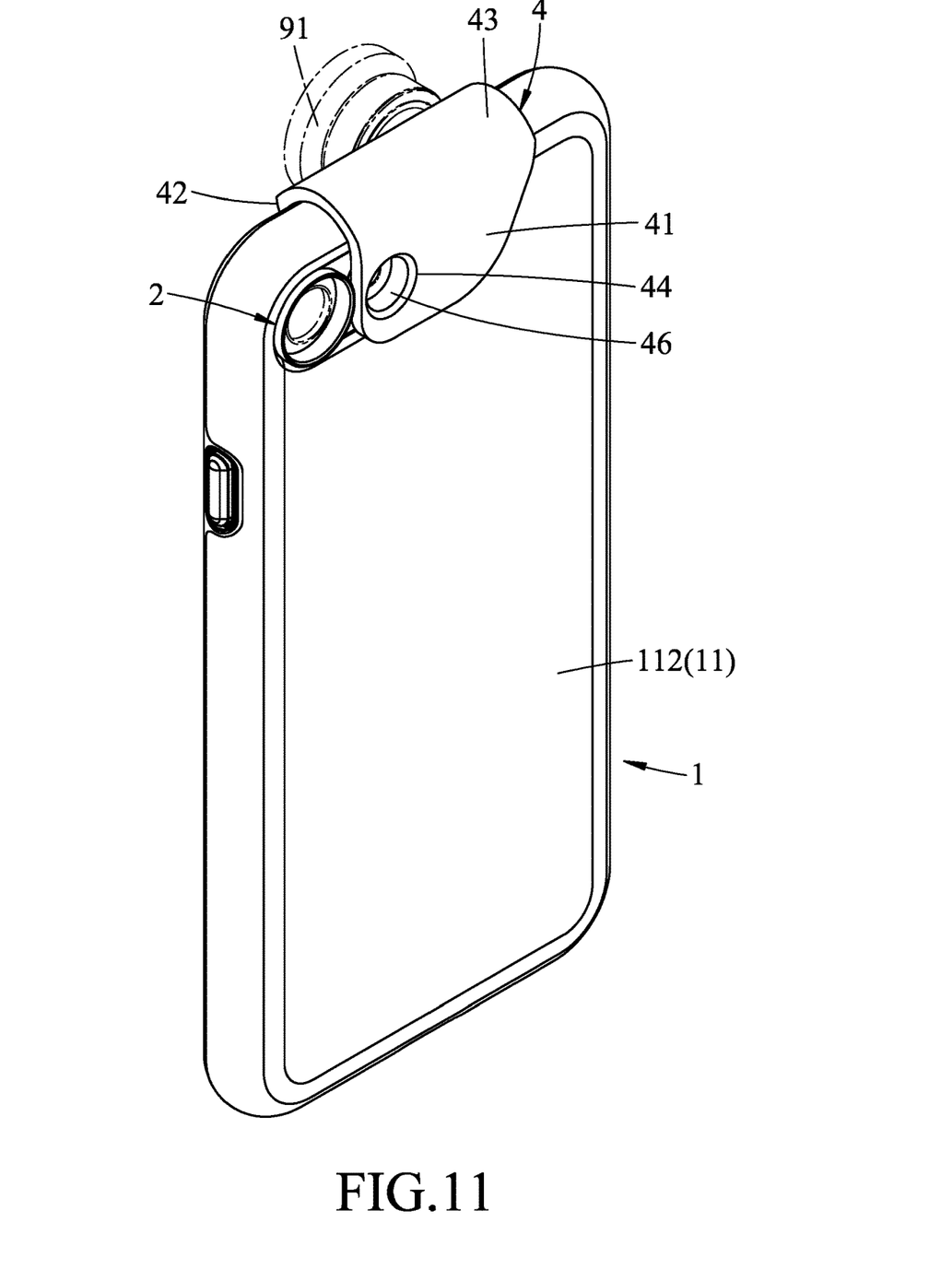
FIG. 11 is an assembled rear perspective view of the third embodiment and the handheld device.
Figure 12:
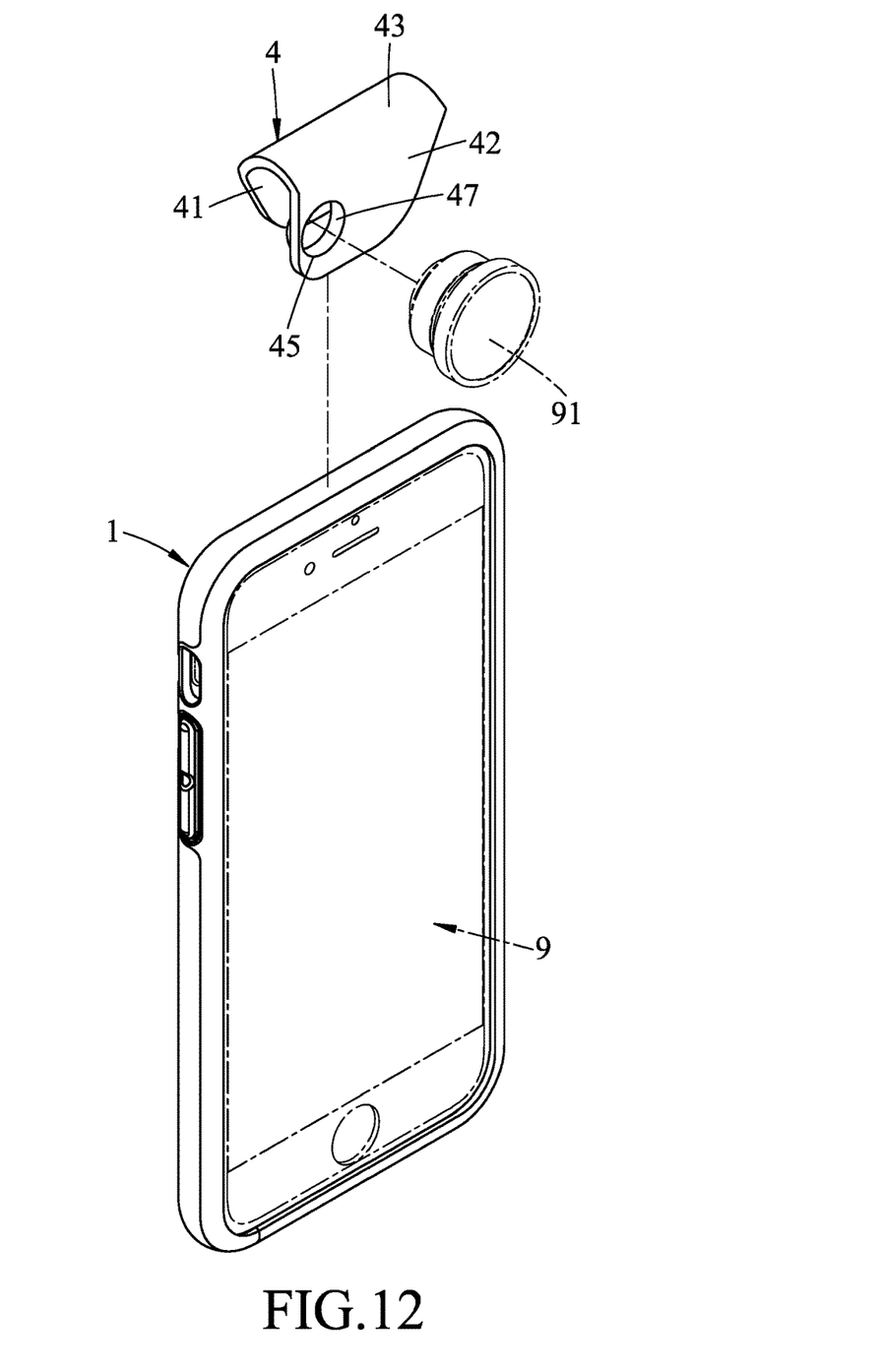
FIG. 12 is a view similar to FIG. 10, but with an auxiliary attachment member of the third embodiment being removed for the sake of clarity.
Figure 13:
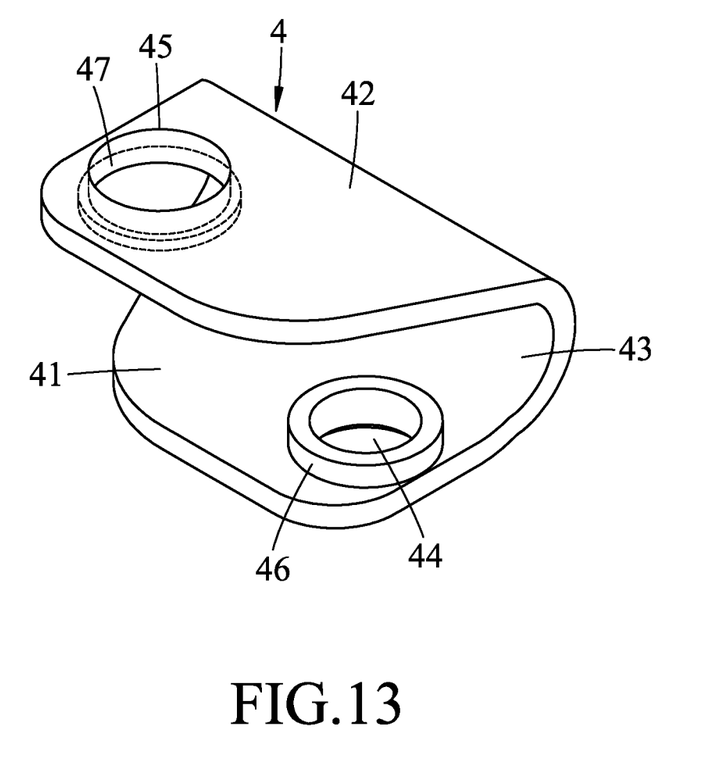
FIG. 13 is a perspective view of the auxiliary attachment member of the third embodiment.

Referring to FIGS. 7 to 9, the second embodiment of the protective cover assembly of this disclosure is shown to be generally identical to the first embodiment. However, in this embodiment, the attachment member (2a) further includes a threaded portion 28 formed on the inner surrounding surface 251 of the annular protrusion 25 and the main hole-defining wall 23 (see FIG. 4), the base plate 21 further has a chamfered surface 216 formed between the second base plate surface 212 and the base outer peripheral surface 213, and the protective cover assembly further includes a locking member 3 removably connected to the attachment member (2a).

The locking member 3 has a locking threaded part 31 threadedly connected to the threaded portion 28. When the locking member 3 is threadedly connected to the attachment member (2a), the accessory unit 91 is clamped between the attachment member (2a) and the locking member 3. In this embodiment, the accessory unit 91 is exemplified as a mobile power bank, but is not limited thereto, and may be an external lens unit, an external flash unit, a portable speaker, a portable tripod unit, etc.

The advantages of the first embodiment can be similarly achieved using the second embodiment. Furthermore, through the presence of the chamfered surface 216, it is easier for the attachment member (2a) to be assembled in the through hole 13 of the protective cover 1. Moreover, apart from fixing the accessory unit 91 through threaded connection with the attachment member (2a), the locking member 3 can also expand the scope of application of the attachment member (2a), thereby increasing the selection of the accessory unit 91 suitable for attachment to the attachment member (2a).

Referring to FIGS. 10 to 13, the third embodiment of the protective cover assembly of this disclosure is shown to be generally identical to the first embodiment. However, in this embodiment, the protective cover assembly further includes an auxiliary attachment member 4 removably clamped on an outer portion of the protective cover 1. The auxiliary attachment member 4 includes a rear plate 41 disposed on the outer cover plate surface 112 of the cover plate body 11, a front plate 42 opposite to the rear plate 41, an intermediate plate 43 connected between the front and rear plates 42, 41, a rear through hole 44 formed in the rear plate 41, a front through hole 45 formed in the front plate 42 for removable engagement of the accessory unit 91 therewith, a rear annular flange 46 connected to and extending from an inner peripheral edge of the rear through hole 44 toward the front plate 42 and inserted into the auxiliary hole 27 (see FIG. 4) of the attachment member 2, and a front annular flange 47 connected to and extending from an inner peripheral edge of the front through hole 45 toward the rear plate 41 and abutting against the handheld device 9. In this embodiment, the accessory unit 91 is exemplified as an external lens unit, but is not limited thereto.

The advantages of the first embodiment can be similarly achieved using the third embodiment. Furthermore, by providing the auxiliary attachment member 4 on the protective cover 1, the accessory unit 91 can be disposed either on the back side of the handheld device 9 through the attachment member 2 or a front side of the handheld device 9 through the auxiliary attachment member 4. Moreover, with the rear annular flange 46 inserted into the auxiliary hole 27 and the front annular flange 47 abutting against the handheld device 9, the auxiliary attachment member 4 can be stably mounted on the protective cover 1 and will not arbitrarily slide to affect the operation of the accessory unit 91.

In sum, the attachment member 2, 2', 2'', 2a of this disclosure is clamped between the protective cover 1 and the handheld device 9, so that it will not fall off and the accessory unit 91 can be stably secured thereto. In addition, through the presence of the main hole 24, the auxiliary hole 27 and the annular protrusion 25, the size of the attachment member 2 and the through hole 13 can be reduced, and the protective function of the protective cover 1 can be enhanced, so that the protective cover 1 can be used alone. Hence, the object of this disclosure can indeed be achieved.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A protective cover assembly for a handheld device having an accessory unit, said protective cover assembly comprising:
  a protective cover configured to removably connect with and to partially cover the handheld device, and including a cover plate body having opposite inner and outer cover plate surfaces, and a through hole extending through said inner and outer cover plate surfaces and defined by a hole-defining wall, said hole-defining wall including a first peripheral wall surface having an outer peripheral end connected to said inner cover plate surface, a second peripheral wall surface connected between an inner peripheral end of said first peripheral wall surface and said outer cover plate surface, and a stepped portion extending from said second peripheral wall surface toward the center of said through hole and having a stepped surface opposite to said outer cover plate surface; and
  an attachment member disposed between said protective cover and the handheld device and removably fitted in said through hole, said attachment member including a base plate, an outer flange extending outwardly from and surrounding said base plate, a main hole extending through said base plate, an annular protrusion protruding from an inner peripheral edge of said main hole and extending out of said through hole for removable attachment of the accessory unit therewith, and an auxiliary hole extending through said base plate adjacent to said main hole, said base plate having opposite first and second base plate surfaces, and a base outer peripheral surface connected between said first and second base plate surfaces, said outer flange having a first flange surface flush with said first base plate surface, and a second flange surface opposite to said first flange surface and abutting against said stepped surface, one of said base outer peripheral surface and said outer flange tightly abutting against said hole-defining wall.

2. The protective cover assembly as claimed in claim 1, wherein said main hole is defined by a main hole-defining wall, said annular protrusion having an inner surrounding surface connected to said main hole-defining wall, said attachment member further including a threaded portion formed on said main hole-defining wall and said inner surrounding surface, said threaded portion being configured to threadedly engage with the accessory unit.

3. The protective cover assembly as claimed in claim 1, wherein said attachment member further includes a scratch-resistant layer disposed on said first base plate surface and said first flange surface.

4. The protective cover assembly as claimed in claim 3, wherein the material of said scratch-resistant layer has a hardness smaller than that of the lead of a 2H pencil.

5. The protective cover assembly as claimed in claim 1, wherein said auxiliary hole is defined by an auxiliary hole-defining wall, and said auxiliary hole-defining wall has a dark hue that is not easily penetrated by light.

6. The protective cover assembly as claimed in claim 1, further comprising a locking member removably connected to said attachment member.

7. The protective cover assembly as claimed in claim 1, wherein said base plate has a chamfered surface formed between said second base plate surface and said base outer peripheral surface.

8. A protective cover assembly for a handheld device having an accessory unit, said protective cover assembly comprising:

a protective cover configured to removably connect with and to partially cover the handheld device, and including a cover plate body having opposite inner and outer cover plate surfaces, and a through hole extending through said inner and outer cover plate surfaces and defined by a hole-defining wall, said hole-defining wall including a first peripheral wall surface having an outer peripheral end connected to said inner cover plate surface, a second peripheral wall surface connected between an inner peripheral end of said first peripheral wall surface and said outer cover plate surface, and a stepped portion extending from said second peripheral wall surface toward the center of said through hole and having a stepped surface opposite to said outer cover plate surface;

an attachment member disposed between said protective cover and the handheld device and removably fitted in said through hole, said attachment member including a base plate, an outer flange extending outwardly from and surrounding said base plate, a main hole extending through said base plate, an annular protrusion protruding from an inner peripheral edge of said main hole and extending out of said through hole for removable attachment of the accessory unit therewith, and an auxiliary hole extending through said base plate adjacent to said main hole, said base plate having opposite first and second base plate surfaces, and a base outer peripheral surface connected between said first and second base plate surfaces, said outer flange having a first flange surface flush with said first base plate surface, and a second flange surface opposite to said first flange surface and abutting against said stepped surface; and an auxiliary attachment member removably clamped on an outer portion of said protective cover, said auxiliary attachment member including a rear plate disposed on said outer cover plate surface, a front plate opposite to said rear plate, an intermediate plate connected between said front and rear plates, a rear through hole formed in said rear plate, a front through hole formed in said front plate for removable attachment of the accessory unit therewith, a rear annular flange connected to and extending from an inner peripheral edge of said rear through hole toward said front plate and inserted into said auxiliary hole, and a front annular flange connected to and extending from an inner peripheral edge of said front through hole toward said rear plate and configured to abut against the handheld device.

9. An attachment member configured to be removably fitted in a through hole of a protective cover for a handheld device and configured for removable attachment of an accessory unit therewith, the through hole in the protective cover being defined by a hole-defining wall which includes a first peripheral wall surface connected to an inner cover plate surface of the protective cover, a second peripheral wall surface connected between the first peripheral wall surface and an outer cover plate surface of the protective cover, and a stepped portion extending from the second peripheral wall surface toward the center of the through hole and having a stepped surface opposite to the outer cover plate surface, said attachment member comprising:

a base plate having opposite first and second base plate surfaces, and a base outer peripheral surface connected between said first and second base plate surfaces;

an outer flange extending outwardly from and surrounding said base plate and having a first flange surface flush with said first base plate surface, and a second flange surface opposite to said first flange surface and configured to abut against the stepped surface of the stepped portion;

a main hole extending through said base plate;

an annular protrusion protruding from an inner peripheral edge of said main hole in a direction away from said base plate for removable attachment of the accessory unit therewith; and an auxiliary hole extending through said base plate adjacent to said main hole;

wherein one of said base outer peripheral surface and said outer flange are configured to tightly abut against the hole-defining wall.

10. The attachment member as claimed in claim 9, further comprising a threaded portion configured to threadedly engage with the accessory unit, said main hole being defined by a main hole-defining wall, said annular protrusion having an inner surrounding surface connected to said main hole-defining wall, said threaded portion being formed on said main hole-defining wall and said inner surrounding surface.

11. The protective cover assembly as claimed in claim 1, wherein said stepped portion of said hole-defining wall further has a transverse surface extending transversely from said stepped surface, and said base outer peripheral surface tightly abuts against said transverse surface.

12. The protective cover assembly as claimed in claim 1, wherein said outer flange further has a flange outer peripheral surface connected between said first and second flange surfaces and tightly abutting against said first peripheral wall surface of said hole-defining wall.

13. The attachment member as claimed in claim 9, wherein the stepped portion of the hole-defining wall further has a transverse surface extending transversely from the stepped surface, and the base outer peripheral surface is configured to tightly abut against the transverse surface.

14. The attachment member as claimed in claim 9, wherein said outer flange further has a flange outer peripheral surface connected between said first and second flange surfaces and configured to tightly abut against the first peripheral wall surface of the hole-defining wall.

* * * * *